No. 755,321. PATENTED MAR. 22, 1904.
C. W. SMITH.
MACHINE FOR PLANING OR SMOOTHING SURFACES OF CURVED
OR IRREGULAR OBJECTS.
APPLICATION FILED AUG. 15, 1903.
NO MODEL. 5 SHEETS—SHEET 1.

WITNESSES
A. T. Palmer
H. M. Kelso.

INVENTOR
Charles W. Smith
By Richard P. Elliott
Attorney

No. 755,321. PATENTED MAR. 22, 1904.
C. W. SMITH.
MACHINE FOR PLANING OR SMOOTHING SURFACES OF CURVED OR IRREGULAR OBJECTS.
APPLICATION FILED AUG. 15, 1903.
NO MODEL. 5 SHEETS—SHEET 2.

WITNESSES
INVENTOR

No. 755,321. PATENTED MAR. 22, 1904.
C. W. SMITH.
MACHINE FOR PLANING OR SMOOTHING SURFACES OF CURVED
OR IRREGULAR OBJECTS.
APPLICATION FILED AUG. 15, 1903.
NO MODEL. 5 SHEETS—SHEET 3.

WITNESSES
A. T. Palmer
H. M. Kelso

INVENTOR
Charles W. Smith
By Richard P. Elliott
Attorney

No. 755,321. PATENTED MAR. 22, 1904.
C. W. SMITH.
MACHINE FOR PLANING OR SMOOTHING SURFACES OF CURVED OR IRREGULAR OBJECTS.
APPLICATION FILED AUG. 15, 1903.
NO MODEL. 5 SHEETS—SHEET 4.

WITNESSES
A. F. Palmer
N. M. Kelso

INVENTOR
Charles W. Smith
By Richard P. Elliott
Attorney

No. 755,321. PATENTED MAR. 22, 1904.
C. W. SMITH.
MACHINE FOR PLANING OR SMOOTHING SURFACES OF CURVED
OR IRREGULAR OBJECTS.
APPLICATION FILED AUG. 15, 1903.
NO MODEL. 5 SHEETS—SHEET 5.

WITNESSES
A. T. Palmer
H. M. Kelso

INVENTOR
Charles W. Smith
By Richard P. Elliott
Attorney

No. 755,321. Patented March 22, 1904.

UNITED STATES PATENT OFFICE.

CHARLES W. SMITH, OF TOWNSEND, MASSACHUSETTS, ASSIGNOR TO ANSON D. FESSENDEN, OF TOWNSEND, MASSACHUSETTS.

MACHINE FOR PLANING OR SMOOTHING SURFACES OF CURVED OR IRREGULAR OBJECTS.

SPECIFICATION forming part of Letters Patent No. 755,321, dated March 22, 1904.

Application filed August 15, 1903. Serial No. 169,668. (No model.)

*To all whom it may concern:*

Be it known that I, CHARLES W. SMITH, of Townsend, county of Middlesex, and State of Massachusetts, have invented certain new and useful Improvements in Machines for Planing or Smoothing Surfaces of Curved or Irregular Objects, of which the following is a specification.

The objects of my invention are as follows: to so construct and arrange the cutting or smoothing head of said machine that its axis will always be parallel to a line drawn through the surface being planed or smoothed.

Another object is to so construct and arrange the planing or smoothing head that it will follow the outline of the surface of the object being planed or smoothed.

A further object of my invention is to provide guides for said planing or smoothing head to limit the depth of material removed during the process of planing or smoothing to a uniform thickness throughout the whole surface being operated upon.

Figure 1:
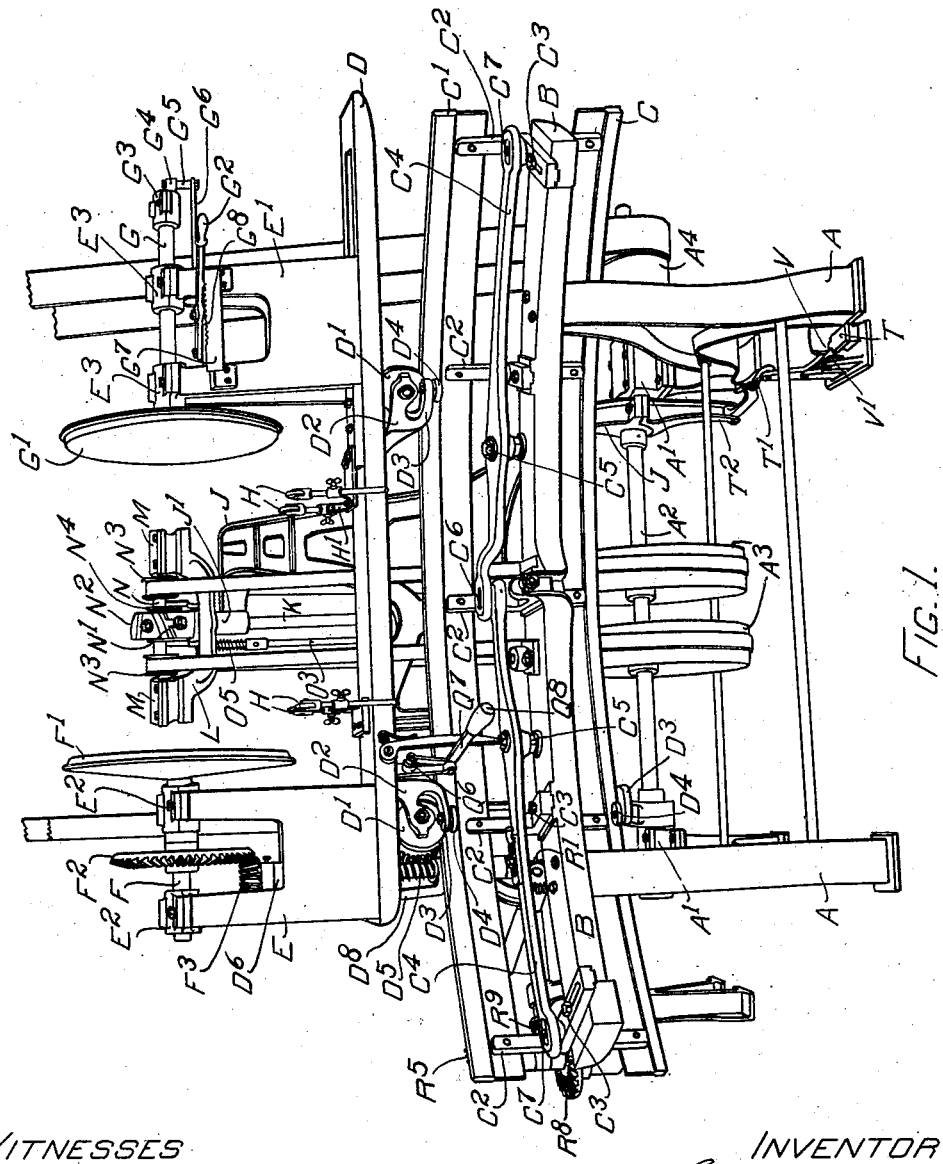
Figure 2:
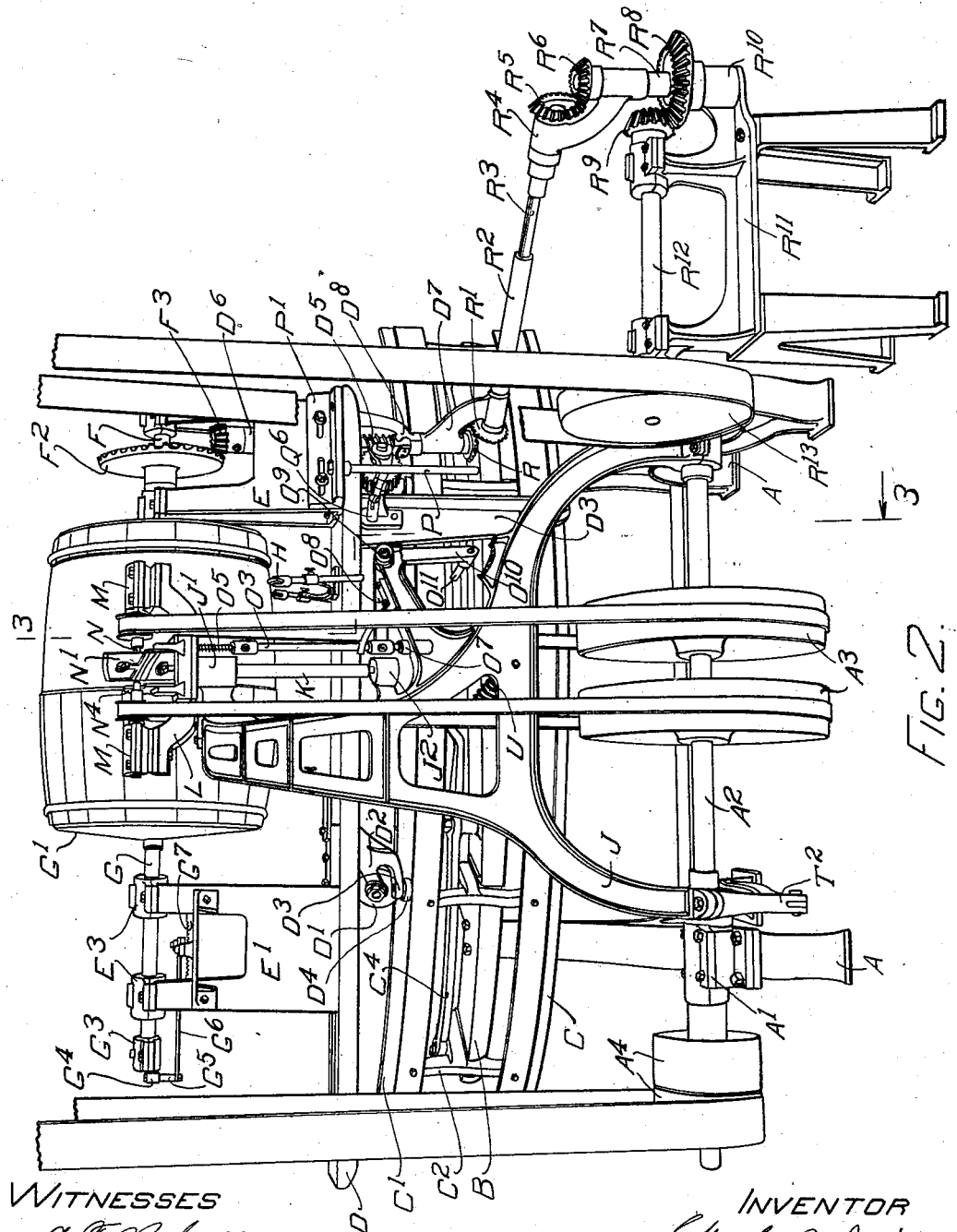
Figure 3:
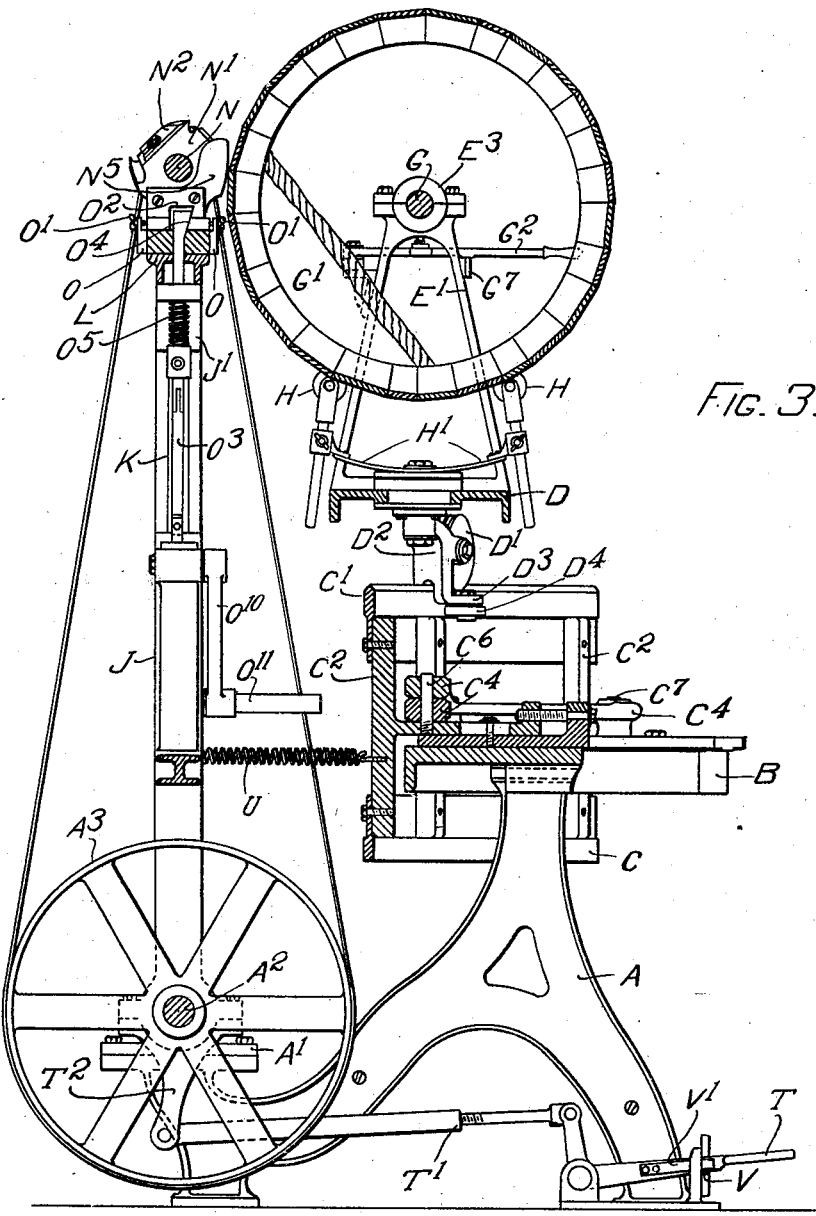
Figure 4:
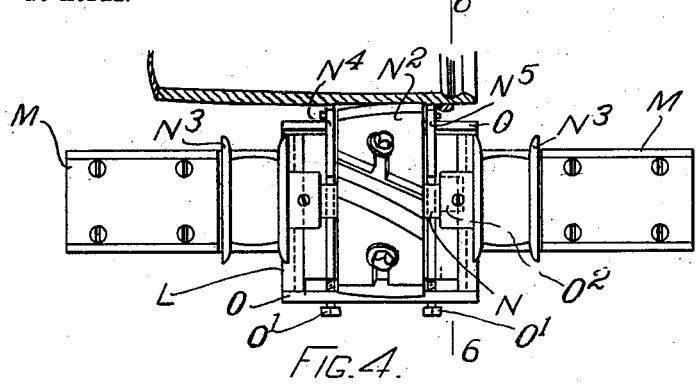
Figure 6:
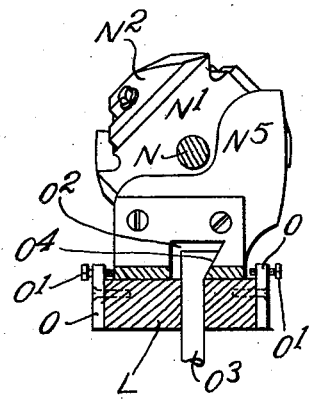
Figure 5:
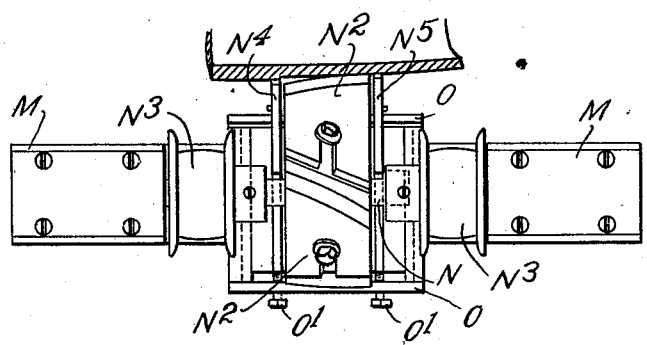
Figures 7, 8:
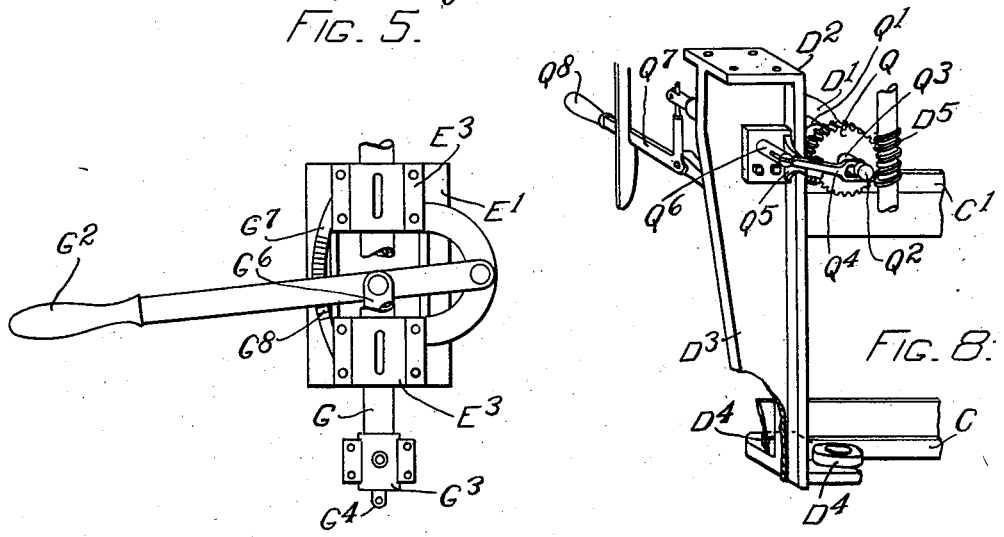
Figure 9:
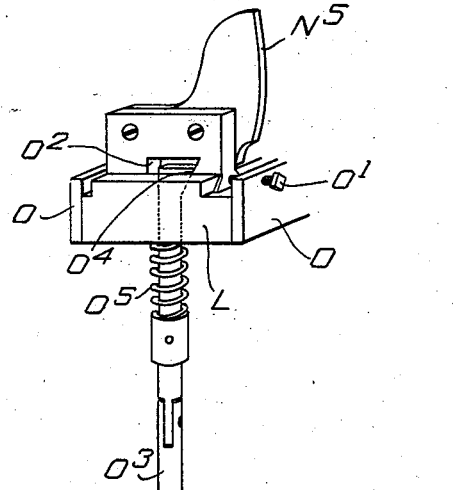
Figure 9:
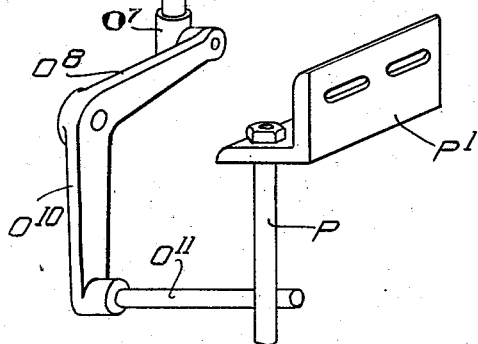

In the drawings illustrating my invention and the best mode of applying the same now known to me, Figure 1 represents a front elevation of my improved device. Fig. 2 represents a rear elevation of the same. Fig. 3 represents a sectional elevation on line 3 3, Fig. 2. Fig. 4 represents a plan view of the cutter-head and bearings in which the same revolves and shows a section of material in the position it would assume in being planed or smoothed by the cutters attached to said head. Fig. 5 represents another plan view of the cutter-head with the guides in a different position from that shown in Fig. 4. Fig. 6 is a sectional view of the cutter-head through line 6 6 on Fig. 4. Fig. 7 is a plan view of lever for sliding the holding-head for holding the object being operated upon. Fig. 8 shows the feeding device for feeding the object being operated upon with relation to the cutting-head. Fig. 9 is a perspective view of the levers and connections for operating the guide $N^5$.

A A represent legs or standards supporting the different mechanisms for holding, feeding, and smoothing a barrel. A bed B is bolted to said standards by suitable bolts. Attached to said bed B are the tracks C and C' by means of suitable brackets $C^2$ $C^2$ $C^2$ $C^2$ $C^2$, which brackets $C^2$ are adjustably mounted upon said bed B and secured thereto by suitable bolts $C^3$ $C^3$ $C^3$ $C^3$ $C^3$. The tracks C and C' are constructed of a flexible material in order that they may be adjusted to different curvatures. A pair of link-bars $C^4$ $C^4$ are pivoted to the bed B by the bolts $C^5$ in such manner as to swing thereon, their inner ends being joined together by the stud $C^6$, fixed in one of the links operating in an elongated hole in the other of said links, the outer ends of said links being pivoted to studs $C^7$ $C^7$, attached to the outermost brackets $C^2$. The object of these links is to serve as equalizers to preserve a uniform curvature in the tracks C and C', as the outer ends of said links $C^4$ must travel an equal distance by reason of their being pivoted together at their inner ends.

The bed D is supported upon and guided by the tracks C and C' by means of guide-wheels $D'$ $D'$, running on the top of track C', and the guide-wheels $D^4$ $D^4$ $D^4$ $D^4$, &c., which contact with and roll upon the sides of the said tracks C' and the track C. One of the brackets $D^2$ has a downwardly-extending portion with lugs upon which are journaled a pair of the guide-wheels $D^4$ in such manner as to contact with and roll upon the sides of the track C. One of said brackets $D^2$ is attached to the under side of the bed D under the head-stock E, the other of said brackets $D^2$ being attached to a projection of the head-stock E' in such manner as to slide longitudinally therewith. The object of attaching one of the brackets $D^2$ to the head-stock E' is so that the bed D will be guided at points near the ends of the object being smoothed, it being obvious that when the head-stock E' is adjusted to smooth objects of different lengths the bracket $D^2$, attached to said head-stock E', will travel therewith and always be at a given distance from the end of the object being smoothed.

Adjustably mounted to the upper side of the said bed D are the head-stocks E and E' in such manner as to be readily adjustable longitudinally on said bed D to permit objects of different lengths being placed between them. The head-stock E is provided with the bearings E² E² in its upward portion, in which the shaft F freely revolves. Said shaft F in this instance is provided with a clamping-head F' suitable for holding the end of a barrel and has also mounted upon it the gear F², which enmeshes with the gear F, mounted upon the upper end of a feed-shaft, which shaft will be hereinafter more fully described. The head-stock E' is provided with bearings E³ E³, in which is revolubly mounted the shaft G. The shaft G has attached to its inner end a clamping-head G', adapted to hold and clamp the end of a barrel, and is free to slide longitudinally in the bearings E³ E³, its movement being controlled by the lever G², attached to the bracket secured to the head-stock E'. A box G³ is revolubly mounted on the shaft G in such manner as to be immovable longitudinally thereon. The box G³ is provided with the bracket G⁴ and the stud G⁵. The link-bar G⁶ is pivoted to the stud G⁵ at its outer end, its inner end being pivoted to the lever G² midway of its length. A sector G⁷ is attached to the head-stock E' and has on its upper surface ratchet-teeth G⁸, adapted to engage a ratchet-tooth on the under side of the lever G², so that by moving the lever G² to the left, as viewed in Fig. 1, the shaft G is moved longitudinally inward to the desired distance and held in said position by the engagement of the ratchet-tooth on the lever G², engaging with the ratchet-teeth G⁸ on the sector G⁷.

The machine described in this specification and illustrated in the drawings is constructed and arranged to clamp and smooth a barrel, although the mechanism herein illustrated is designed to smooth irregular objects other than barrels.

H H H H represent guides for supporting and alining a barrel placed thereon in such position that the heads F' and G' may readily enter the ends thereof to clamp it and revolve it in front of the planing or smoothing cutters. These guides H H H H are adjustably secured in bosses attached to the ends of springs H' H' H' H', which springs are secured by suitable bolts to the upper surface of the bed D, as is more clearly illustrated in Fig. 3. The object of the springs H' H' H' H' is to allow the guide-rolls H H H H to be deflected downward when contacting with any irregularity on the surface of the object being planed or smoothed and as constructed constitute what might be termed a "flexible" support. The standards A A are provided with bearings A' A', in which is revolubly mounted the shaft A². Said shaft A² has mounted thereon the pulleys A³ A³ and the tight and loose pulleys A⁴ A⁴. Revolubly mounted on said shaft A² is the supporting-frame J, in the upper end of which are bearings J' and J². The shaft K is revolubly mounted in the bearings J' and J² and has attached to its upper end the head-supporting frame L. Bearings M M are attached to said frame L and have a shaft N revolubly mounted therein. To the shaft N is secured the cutter-head N', which cutter-head has attached thereto planing or smoothing knives N² N² N² N². Said shaft N has also secured to it the pulleys N³ N³, which are driven by suitable belts from the pulleys A³ A³, their purpose being to rapidly revolve the cutter-head N' to cause it to plane or smooth any object with which it may be brought in contact.

The cutter-head N' is provided with the guides N⁴ and N⁵, both of which are adjustable. The guide N⁴ is adjustably attached to the supporting-frame L in such manner as to permit the cutters N² N² N² N² to cut to different depths, whereas the guide N⁵, while being adjustably attached to the cutter-head N', is at the same time so adjusted as to be movable longitudinally in ways in said cutter-head, so that it may be moved in or out by suitable mechanism an amount equal to the depth of the material removed from the surface of the object being smoothed. By referring to Fig. 6 the guide N⁵ is seen as being moved inward a distance equal to the depth of cut of the knives N². The adjustment of the guide N⁵ is a very important feature, for by comparing the drawings Fig. 4 and Fig. 5 it will be seen that if the guide N⁵ was not moved outwardly, as shown in Fig. 4, the knives N² would continue to cut deeper and deeper into the material being smoothed as the said object was being moved endwise and the guide N⁵ moved over that portion from which the material had been removed. The guide N⁵ is moved outwardly automatically as the bed D is moved longitudinally upon the tracks C and C' to feed the material before the cutting-head and moves outwardly so soon as it passes by the shoulder left by the cutter in performing the first portion of its cut, as illustrated in Fig. 4.

The means for moving the guide N⁵ are shown in Fig. 6. Said guide N⁵ has a dovetail portion on its lower surface, as shown in Fig. 3, which slides in a dovetailed groove cut crosswise of the portion L of the cutter-head and is limited in its crosswise movement by the stops O O, which are provided with adjusting-screws O' O'. In the under side of the guide N⁵ is a recess O², one side of which is formed with an inclined surface shaped to receive the head of the vertical adjusting-rod O³ and so arranged that when said rod O³ is moved downward the inclined surface O⁴ contacts with the incline in the recess in the guide N⁵, thereby moving said guide inwardly until it contacts with the adjusting-screw O'. The rod O³ has a bearing in the cutter-head L, the other end being confined by the collar O⁷. The purpose of the spring O⁵ is to cause the rod $O^3$ to be normally held downward. The lower end of said rod $O^3$ has a bearing $O^7$ on a portion of the cutter-supporting frame J and is free to move vertically in said bearings. To the lower end of the rod $O^3$ is attached a bell-crank lever $O^8$, which is pivoted at its central portion to the pivot-bolt $O^9$ and is free to swing thereon. The downwardly-extending portion $O^{10}$ has a round rod $O^{11}$ inserted therein, which rod is adapted to contact with the spindle P, which is adjustably secured in the bracket P', attached to the head-stock E. The rod $O^3$, bell-crank lever $O^8$, and portion $O^{10}$ are so adjusted as to move the guide $N^5$ when the pin $O^{11}$ is out of contact with the spindle P. This takes place so soon as the barrel being smoothed has fed a sufficient distance to allow the guide $N^5$ to drop into the groove cut by the cutters $N^2$ during the first revolution of the barrel.

The bed D, which carries the head-stocks and the object being smoothed, is fed longitudinally by means of a worm-gear $D^5$, secured to the shaft which revolves in the bearings $D^6$ in the head-stock E, and a bracket $D^7$, pivoted in the bracket $D^8$, which is attached to the under side of the bed D. The bracket $D^7$ is free to revolve in the bearing in the bracket $D^8$ as the table D moves longitudinally. The feed for the table D is more clearly shown in Fig. 8, where the worm $D^5$ is shown as enmeshing with the worm-gear Q, which latter has a bearing on the shaft Q' and revolves freely thereon. The shaft Q' has mounted on its other end one of the guide-rolls D'. Also mounted on said shaft Q' is a clutch member $Q^2$, arranged to slide endwise, the teeth of which engage with a clutch member $Q^3$, secured to the worm-gear Q. The clutch member $Q^2$ is free to slide longitudinally on the shaft Q', but is prevented from rotation thereon by any suitable means, as a spline and keyway. A clutch-lever $Q^4$ is pivoted in a bracket $Q^5$, attached to the bracket $D^3$, its inner end engaging the clutch member $Q^2$, its outer end having pivoted thereto the rod $Q^6$, which is free to slide in a bearing in the portion $D^3$. To the outer end of the rod $Q^6$ is pivoted a bell-crank lever $Q^7$, having a handle on its outer end, the arrangement of the parts being such that the movement of the handle $Q^8$ up or down moves the clutch member $Q^2$ in or out of engagement with the member $Q^3$, thereby throwing the feed mechanism of the table D in or out, as desired, the table D being fed forward or back by the frictional contact of the roll D' on the track C'. The shaft which drives the worm-gear $D^5$ is driven by means of the bevel-gears R and R', one of which is located on said shaft, the other of which is located on the telescopic shaft $R^2$, which is adapted to receive the shaft $R^3$ and prevented from turning thereon by any suitable means, such as a key sliding in the keyway. The shaft $R^3$ has a bearing in the bracket $R^4$ and has on its outer end a bevel-gear $R^5$, which enmeshes with the gear $R^6$, attached to the shaft $R^7$. The shaft $R^7$ has a bearing in one end of the bracket $R^4$. Said shaft $R^7$ has also mounted upon it the bevel-gear $R^8$, which enmeshes with the gear $R^9$. The lower end of said shaft $R^7$ extends downward into the bearing $R^{10}$, which is attached to the hanger $R^{11}$. The bracket $R^4$ is guided and held in position by the shafts $R^3$ and $R^7$ and is free to revolve about said shaft $R^7$ to preserve its alinement with the driving mechanism for driving the table D. The gear $R^{10}$ is driven by the shaft $R^{12}$ through the medium of the pulley $R^{13}$, which is driven by a belt from any suitable counter-shaft. The barrel or material placed between the clamping devices is revolved upon the shaft F in the head-stock E by means of the bevel-gears $F^2$ and $F^3$, which are adapted to enmesh.

In describing my invention I have shown the table D as supported by tracks adjusted to a semicircle; but I do not wish to limit myself to a table traveling upon semicircular tracks, as my device will work equally well if moved upon straight tracks, for the cutter-head N, owing to the arrangement for mounting the same—to wit, upon the end of the shaft K which is free to revolve in the bearings J' and $J^2$ in the supporting-frame J—will swivel thereon and follow any irregular outline of the object being smoothed without the necessity of said object traveling on a track conforming to its shape, for through the medium of the guides $N^4$ and $N^5$ the cutter-head N will swing and aline itself with a line drawn through the surface they contact with.

U is a spiral spring one end of which is attached to the frame of the machine, its other end being attached to the swinging frame J, its object being to hold the frame J inward and the guides $N^4$ and $N^5$ in contact with the object being smoothed. The frame J is moved outward against the tension of the spring U by means of the treadle T and the adjustable connection T', which is pivoted to the downward-projecting portion $T^2$ of the frame J.

A hook V and the spring V' to engage the same is provided to hold the treadle T down in order to hold the frame J in an outward position while the finished barrel is being removed and another inserted.

The operation of my invention as applied to a mechanism for smoothing the outside of barrels is as follows: The clamping-head G' is moved endwise through the medium of the lever $G^2$ a sufficient distance to allow a barrel being inserted. The lever is then pulled inward until the heads F' and G' securely hold the barrel between them. The treadle T then being released, the spring U swings the frame J inward until the guides $N^4$ and $N^5$ contact with the surface of the barrel, it being understood that the cutter-head is being rapidly revolved by the belts and the barrel is being revolved through the medium of the feeding mechanism in the head-stock E. Hence while the cutters are revolving the barrel placed between the heads F' and G' is also revolving, so that a groove would be cut around the surface of the barrel, as illustrated in Fig. 4. The lever $Q^8$ is then moved upward through the clutch $Q^2$ into engagement with the worm-gear Q, causing same to revolve and feed the barrel forward in the direction of the arrow, Fig. 2, and, as has been before explained, so soon as the rod $O^{11}$ is moved out of contact with the spindle P the guide $N^5$ would be moved outward a distance sufficient to compensate for the thickness of material removed by the cutters, thus causing the cutters to remove a uniform thickness from end to end of the barrel and around its periphery.

The moving of the guide $N^5$ outward is a very essential feature of this invention, for were it not moved outward to compensate for the thickness of material removed by the cutters said cutters would gradually work inward until they would cut the staves of a barrel in two. As the guide $N^5$ is arranged to operate it provides for a smooth cut from the first cut removed around the barrel until the cut is finished at the opposite end thereof.

Having described my invention and its operation, what I claim is—

1. In a machine for smoothing irregular objects, such as barrels, means for clamping the object; power-driven means for feeding the object rotatively and longitudinally before the cutters; a rotary cutter; means for supporting said rotary cutter in a manner to permit it to swing toward and from the object being smoothed, and to oscillate in a horizontal plane, so that its axis will be parallel to the surface being smoothed; adjustable guiding means arranged to prevent the rotary cutter from removing more than a determined thickness of material from the surface being smoothed, said guiding means being automatically adjustable to guide the rotary cutter from both the rough surface of the object and the smoothed surface thereof.

2. In a machine for smoothing the surfaces of regular and irregular objects, means for clamping the object; power-operated means for feeding the object both rotatively and longitudinally before a smoothing-cutter; a supporting-frame pivotally attached to the machine; bearings for a rotary cutter pivotally mounted in the supporting-frame; a rotary cutter; means for revolving the rotary cutter adjustable to its different positions; and guiding means for limiting the thickness of material removed by the rotary cutter from either the rough surface of the object or from the smoothed surface thereof.

3. A machine for smoothing the surface of curved or irregular objects, means for clamping, revolving and feeding the object longitudinally; a smoothing-head revolubly mounted in oscillating bearings; smoothing means secured in said smoothing-head; means to move said smoothing-head toward and from the work to be smoothed; adjustable guiding means to cause the smoothing-head to follow the outline of the surface to be smoothed; and means for revolving the smoothing-head.

4. In a mechanism for smoothing the surfaces of irregular objects, means for clamping, revolving and feeding the object; a cutter-head; smoothing-cutters mounted thereon; an oscillating frame in which said cutter-head is revolubly mounted; a swinging frame in which said oscillating frame is revolubly mounted; means for moving said swinging frame from and toward the object to be smoothed; guiding means adjustably secured to the oscillating frame; means for moving one of said guides on said oscillating frame to gage the depth of cut of the cutters; and means for revolving said cutting-head.

5. In a device for smoothing the surfaces of irregular objects, a revolving cutter-head having cutters mounted thereon; said cutters; a frame in which said cutter-head is revolubly mounted, said frame being so constructed and arranged as to permit the cutter-head to swing toward and from the object being smoothed and to allow it to swing in a horizontal plane so that its axis may be turned at different angles to the axis of the object being smoothed; and automatically-adjustable guiding means adapted to gage the depth of cut from both the rough and the smoothed surfaces of the object to be smoothed.

6. In a machine for smoothing curved and irregular objects, means for holding and revolving the object; means for feeding the object in both a straight and curved line; means for smoothing the straight and irregular surfaces of the object; and guides for regulating the depth of cut of the smoothing means from both the rough and smooth surfaces.

7. In a machine for smoothing the surfaces of curved objects, means for clamping, revolving and feeding said objects; revolving cutters pivoted to the frame of said clamping and feeding mechanism; means for keeping the said revolving cutters in alinement and in cutting contact with the surfaces being smoothed; and means for gaging the depth of cut from both the rough and smooth surfaces.

8. In a machine for smoothing the surface of curved objects, clamping, revolving and feeding mechanism comprising a frame having tracks adjustable to either a straight or curved line; a bed supported upon and arranged to move in the direction of said tracks; a stationary head-stock and an adjustable head-stock mounted on said bed; spindles revolubly mounted in said head-stocks; clamping means mounted on said spindles; means for revolving said spindles and self-adjusting feed mechanism for feeding said bed longitudinally.

9. In a machine for finishing the surfaces of barrels and other curved and irregular objects, means for clamping, revolving and feeding said objects longitudinally; a revolving cutter arranged so that its axis will swing to a position parallel to the surface being finished; means for holding said revolving cutter in cutting contact with the object being smoothed; adjustable guiding means for gaging the depth of material removed by the cutters from the rough surfaces when the object is being revolved but not fed longitudinally; and means for adjusting said gages so they will gage the depth of cut when the object is being revolved and fed longitudinally.

10. A machine for finishing the surfaces of curved objects, comprising means for clamping, revolving and feeding an object longitudinally in a line approximating the curvature of the object; revolving cutters and guides so constructed and arranged that the cutting edge of said cutters will be parallel to the surfaces to be smoothed; means for revolving said cutter-head; and means for automatically adjusting one of said guides to gage the depth of cut from both the rough and the smooth surfaces.

11. A finishing-cutter, comprising a revolving cutter-head and means for revolving same; cutters mounted on said cutter-head; guides mounted adjacent the ends of said cutter-heads; means for automatically adjusting one of said guides; and means for causing said cutters to move into cutting contact with the object to be finished.

In testimony whereof I have hereunto set my hand, in the presence of two subscribing witnesses, this the 30th day of July, 1903.

CHARLES W. SMITH.

Witnesses:
 RICHARD P. ELLIOTT,
 H. M. KELSO.